Figure 1:
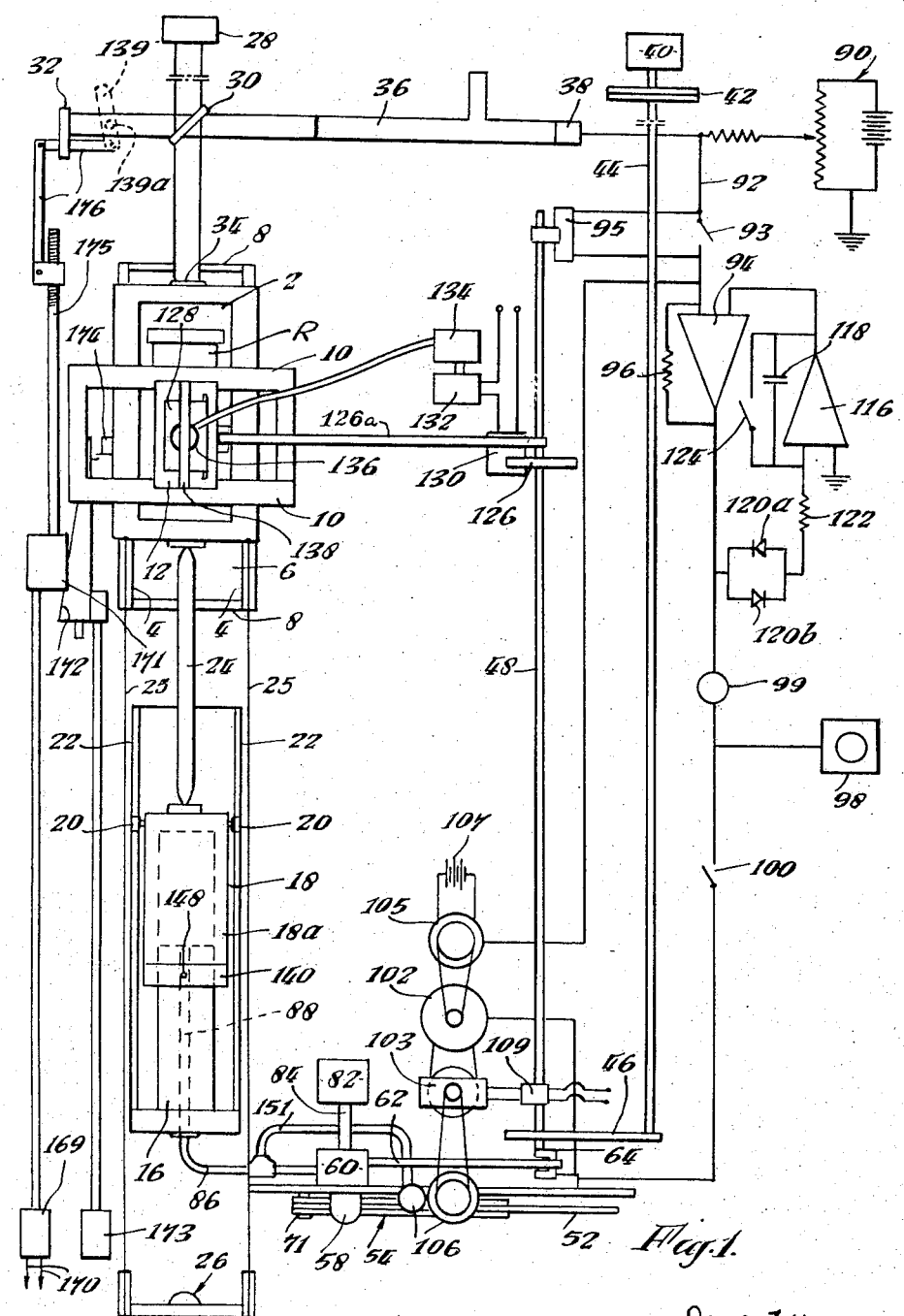

Inventor:
Walter Reginald Horsfield
By Baldwin & Wight
Attorneys

Oct. 3, 1967  W. R. HORSFIELD  3,344,526
DIFFRACTION GRATING APPARATUS
Filed March 1, 1965  3 Sheets-Sheet 3

Inventor:
Walter Reginald Horsfield
By Baldwin & Wight
Attorneys

United States Patent Office 3,344,526
Patented Oct. 3, 1967

3,344,526
DIFFRACTION GRATING APPARATUS
Walter Reginald Horsfield, Outlook, Warwick, Bermuda
Filed Mar. 1, 1965, Ser. No. 436,107
Claims priority, application Great Britain, Apr. 1, 1964, 13,498/64
25 Claims. (Cl. 33—19)

This invention is concerned with the provision of a novel means for the ruling of diffraction gratings.

Such gratings, consisting of a large number of uniformly spaced parallel lines engraved on a plane reflecting surface, have a wide application in optical instruments. The line spacing required depends upon the region of the spectrum for which the grating is to be used and may be from some 1,000 lines per inch for the infra red range to some 30,000 lines per inch for high resolution work in the visible spectrum. The dimensional standards required for the finished product are very high. Parallelism of the grooves and uniformity of their profiles is important but one of the main difficulties has been the maintenance of uniformity of spacing which should not vary more than about one millionth of an inch between any two lines of the grating.

It has been customary to determine this spacing by a lead screw in the grating ruling mechanism. The manufacture of such a drive to maintain line spacings within the necessary tolerance involves an extremely long process and, even then, the transmission of torque to the screw in the completed mechanism introduces the possibility of periodic errors. In addition, wear of the screw and its associated correcting gear can introduce aperiodic errors into the line spacing.

According to the present invention a diffraction grating ruling mechanism comprises a carriage to support a grating blank and a tool-bearing cross-carriage longitudinally movable relative to the carriage to produce a series of spaced grating lines on the blank, said relative movement being developed by a hydraulic ram operated by a fluid pressure generating device, the flow through said device being controllable by servo means actuated from a measurement device responsive to the relative change of position, at succeeding ruling stations, between the cross-carriage and the carriage. By means of such an arrangement, the final drive producing the relative longitudinal movement, usually by displacement of the grating blank, does not involve the use of rotating parts and the periodic errors which can arise from such a source are thereby avoided. Moreover, the use of a servo control to determine the line spacing of the grating provides a means of correcting aperiodic errors that might arise in the prolonged use of the mechanism.

A preferred feature of the invention is the use of a positive displacement pump for generation of the fluid pressure and the inclusion in the pump controlling mechanism of means limiting the pump delivery and causing a small but rapid reversal of its stroke at the end of a delivery movement. In the absence of such a reversal, it could usually be expected that the movement of the hydraulic ram asymptotically approaches a final position at the termination of each delivery stroke of the pump. If, however, while the pump delivery outlet is connected to the ram, the delivery pressure is relieved by withdrawing a small proportion of the fluid in the line to the ram, this can be avoided and a relatively accurate positioning of the ram can be achieved without any significant time lag.

The servo system, which can receive its input from an optical interferometer, for example a Michelson interferometer, in known manner, can comprise means for adjusting the delivery of the pump, either at each stroke or for a given series of strokes.

Figure 2:
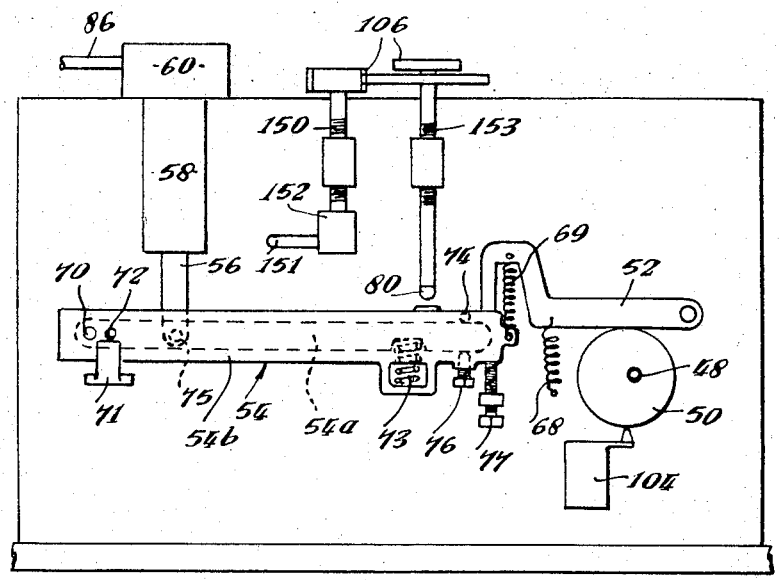
Figures 3, 4:
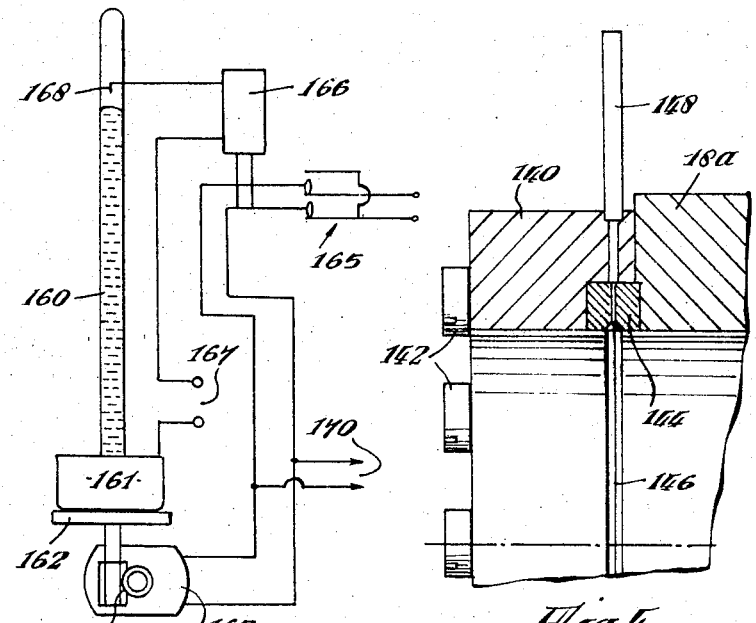
Figure 5:
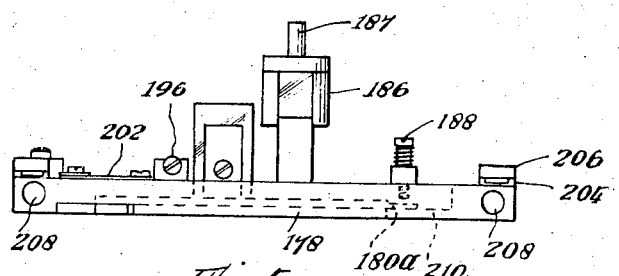
Figure 6:
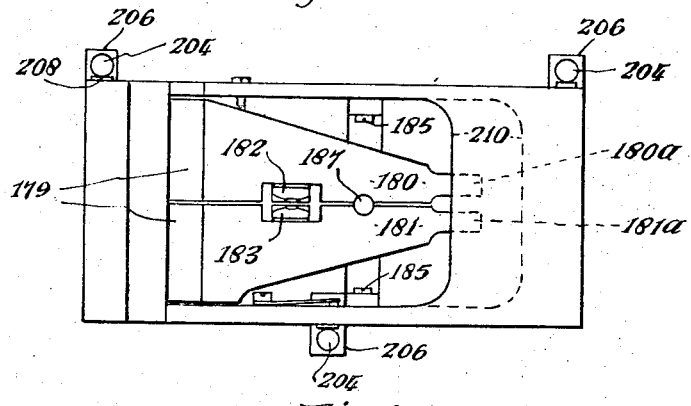
Figure 7:
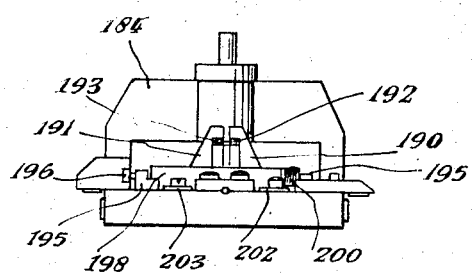

One form of the invention will now be more particularly described with reference to the accompanying drawings wherein:

FIG. 1 is a schematic plan view of a mechanism according to the invention,

FIG. 2 is a side view of part of the mechanism in FIG. 1 showing the drive arrangement for the ram pump, FIG. 3 is a schematic illustration of the barometric control means used with the apparatus, FIG. 4 is a detail section view of the seal between the piston and cylinder of the carriage ram, and FIGS. 5 to 7 are, respectively, a side elevation, a plan view from below and a front elevation of a modified form of cross-carriage having two ruling tools.

Referring more particularly to FIG. 1 of the drawings, the mechanism comprises a carriage 2 on which a reflector blank R is clamped. The carriage slides on lapped guides 4 of a fixed base 6 in the form of a trough with end members 8, the interior of the base being filled with mercury so that the bottom portion of the carriage is immersed in that substance and only some 5% to 10% of its weight is taken by the guides 4. The carriage preferably comprises polytetrafluoroethylene shoes (not shown) bearing on the guides 4. A dry bearing system such as this has an inherently greater positional accuracy than a fluid film lubrication system while, in combination with the load-relieving effect of the mercury bath, it is found that sticking can be avoided. On fixed guides 10, straddling the carriage and base, a cross-carriage 12 carries a diamond ruling tool (not shown) which is to form the grooves in the blanks.

The carriage 2 is moved along its guides 4 by a hydraulic ram comprising a fixed piston 16 over which a movable cylinder 18 fits. The end of the cylinder remote from the piston is supported by rolling bearings 20 running on guideways 22. A connecting rod 24 transmitting the cylinder motion to the carriage is held between point bearings on these parts by a symmetrically placed pair of tension wires 25 which are connected between the carriage and a pulley and weight arrangement 26. This also returns the carriage after a workpiece has been engraved and the cylinder pressure has been released. It is arranged that the guides 4 and 22, the rod 24 and the wires 25 lie in the same horizontal plane as the axis of the cylinder 18 so that the transmission of drive to the carriage 2 produces a symmetrical disposition of all reactions to the driving force and no tilting moments can develop.

The hydraulic fluid driving the cylinder is delivered from a positive displacement piston pump 58. Power for the pump comes from a motor 40 through a resilient coupling 42 smoothing out torque variations, to an input shaft 44 which is connected by a belt drive 46 to a power shaft 48. In operation, the shaft 48 can be rotated at a speed of some seventeen or more revolutions per minute.

Referring more particularly to FIG. 2 of the drawings, the shaft 48 has an eccentric 50 which acts upon a crank lever 52 held against the eccentric by a spring 68. The cranked end of the lever 52 can bear upon a compound lever 54 and a spring 69 tends to hold the two levers together, the compound lever 54 thereby transmitting the oscillation of the cranked lever to a plunger 56 of the piston pump 58 which also comprises a slide valve 60 driven by rod 62 (FIGURE 1) from a crank 64 on the power shaft 48. Fluid from a reservoir 82 is taken to the pump through inlet pipe 84 and a delivery pipe 86 connects the pump to the cylinder interior through bore 88 in the ram piston 16.

In order both to ensure accuracy of movement of the blank carriage and to prevent any movement taking place once a line has begun to be engraved, it is desirable to bring the ram cylinder to rest as quickly as possible after each delivery stroke of the pump. In the mechanism illustrated, this is done by reversing the stroke of the pump relatively sharply at the end of each delivery stroke and this is performed by virtue of the arrangement of the compound lever 54. The lever comprises inner and outer arms 54a, 54b respectively interconnected at one end by a pivot pin 70. In addition, a fixed block 71 supports from below pin 72 secured to the outer arm 54b. Near their other ends, a compression spring 73 between the arms urges the inner arm 54a against upper stop 74 fixed to the outer arm.

The plunger 56 of the pump is pivoted at 75 to the inner arm and, as so far described, the two arms will move together, pump suction and delivery being determined, in dependence upon the slide valve movement, by this reciprocation of the lever. However, a stop 80 is able to bear upon the inner arm 54a of the compound lever as the lever, pivoting on the block 71, rises under the action of the cranked lever 52. As the inner arm comes against the stop, its further rotation takes place about that point of contact while the outer arm 54b continues to be drawn up by the cranked lever. The change in centre of rotation of the inner arm 54a has the result that the piston connected to the arm, and until now being moved upwardly on a delivery stroke, has its motion sharply reversed. Of course, operation of the slide valve 60 closes the delivery pipe before the reverse motion builds up a flow of any significant magnitude. Further adjustable stops 76, 77 respectively limit the downwards motion of the arms 54a, 54b.

Measurement of the movements of the carriage to enable control of grating line spacing is derived from an optical system comprising a conventional Michelson interferometer. This includes a light source and collimating system 28, a beam splitter 30, a fixed reflector 32 and a second reflector 34 attached to the carriage 2. The fringe pattern received by an objective lens system 36 resulting from the interference between the reflected light from the surfaces 32, 34 will change in accordance with the movement of the reflector 34 with the carriage 2 and the resultant intensity of light at a point on the focal plane of the system 36 will thereby exhibit a sinusoidally varying intensity. This is detected by a photomultiplier 38 for the purpose of controlling the distance of movement of the carriage 2.

There will always be some light present as the fringes move across the field of view so that a D.C. component is also present in addition to the sinusoidally varying intensity input from the interferometer but, for the processing of the photomultiplier output signal, it is convenient to remove this by means of an offsetting potentiometer 90. Consequently, a sinusoidal A.C. signal is produced in line 92 to an amplifier 94 which is bridged by a feed-back resistor 96.

Clearly, if movement of the carriage between ruling each line results in the passage of an integral number of fringes, the extent of that movement can be determined with great accuracy. The intermittent motion of the carriage results in a signal having alternating periods of sinusoidal and D.C. voltages, the differences between successive D.C. voltages indicating that a fractional number of fringes have been passed. The function of the carriage movement control is therefore to reduce the successive D.C. differences as much as possible, preferably aiming for a zero D.C. output so as to take advantage of the inherent sensitivity of a null system.

For initial adjustment of the apparatus, the amplifier output can be fed to an oscillograph 98. Manual adjustment of the pump delivery is then made until the oscillograph trace indicates that the number of fringes passed is only slightly greater than an integral figure. 99 indicates a meter, preferably with a high inertia movement, that can be used additionally or alternatively to the oscillograph 98.

Further control of the carriage movement operates during the ruling of a grating and the fine adjustment means provided for this are brought into action by the opening of a switch 93 which directs the amplifier input through a cam-operated microswitch 95 (open-circuiting the amplifier for a period during each revolution of the shaft 48), and the closure of a switch 100 which brings the amplifier output through a servomotor 102 through a microswitch 104 operated by the eccentric 50, the amplifier output thereby being sampled at each revolution of the shaft 48 while the carriage is at rest. In response to the D.C. signal at this instant, the servomotor is allowed to act through an electro-magnetic clutch 103 to rotate reduction drive 106 which produces two effects.

Firstly, the drive rotates a screw-shaft 150 (FIG. 2) the end of which carries a plunger in a compensating cylinder 152. A pipeline 151 connects the cylinder to the supply circuit of the carriage ram and movement of the plunger by rotation of the shaft 150 will increase or decrease the volume of the cylinder 152 so withdrawing or supplying fluid to the ram and causing a movement of the carriage in dependence upon the error signal that has been transmitted to the servomotor.

Secondly, the reduction drive 106 also rotates shaft 153 on which the stop 80 is mounted and a corresponding adjustment is thereby made to the volumetric delivery at each stroke of the pump since the timing of the reversal of the pump piston will be altered by the movement of the stop 80. Thus, when the shaft 150 is lowered to make a forwards adjustment of the ram position, the stop 80 is raised to delay the point of reversal of the pump stroke and so cause a greater volume to be passed at the next delivery stroke.

The servomotor 102 operates on a closed loop system being mechanically coupled to a rotary potentiometer 105, fed from an independent D.C. supply 107, which passes its output to the amplifier 94. Thus, as the servomotor rotates, an increasing signal is fed to the amplifier to balance the original output therefrom. The clutch 103 is intermittently operated by a cam-operated microswitch 109 from the power shaft 48 in sequence with the switching of the servomotor. The cycle of operations in the fine adjustment means described is as follows:

(i) The pump 58 supplies fluid to the ram causing the carriage to move and, after the movement of the interferometer fringe pattern, a D.C. bias signal is directed to the amplifier in dependence upon the error in the movement through the microswitch 95 which has been closed before the movement begins;

(ii) The corresponding amplifier output is momentarily transmitted to the servomotor through the microswitch 104 and, at the same time, the clutch 103 is engaged connecting the servomotor to the reduction drive of the correction devices—rotation of the motor turns this drive and the feed-back potentiometer 105 until the feed-back signal cancels the D.C. bias and the servomotor comes to rest;

(iii) The clutch is now opened and, immediately following this, the amplifier is open-circuited by the switch 93—the servomotor is therefore returned to its zero position because of the potentiometer bias that has been built up in the preceding stage and, because of the mechanical connection from the servomotor, the potentiometer signal is also canceled;

(iv) The carriage position having been corrected, the ruling of a grating line now proceeds and, after this has been done, the sequence begins again.

Because of the correction already made to the pump stroke by the adjustment of the stop 80 in each preceding sequence, one can arrange that the ram movement in the succeeding pump stroke is marginally overcorrected with the result that the fine adjustment system hunts around the exact movement required but keeps the actual movements within acceptable limits. For stability, the correction of the pump delivery volume is arranged to be only a fractional part of the volumetric correction applied through the compensating cylinder.

In this description of the fine adjustment of the movements of the carriage, it has so far been assumed that the bias of the photomultiplier output remains constant. This would not be the case if the range of movement of the carriage 2 was significant in comparison with the mean distance between the reflector 34 and the beam splitter 30 as the average intensity of illumination on the photomultiplier would progressively decrease as this distance increases. Correction of this could be made by gradual adjustment of the output from the potentiometer 90 but, in the illustrated embodiment, additional means are provided for this purpose comprising a second amplifier 116 bridged by an integrating capacitor 118.

The first, main amplifier 94 provides an input for the second amplifier through oppositely directed diodes 120a, 120b. The oscillating signal from the amplifier 94 during movement of the carriage, when not correctly biassed by the potentiometer 90, will have different values in the positive and negative phases and the diodes each pass the peak voltage of the respective phases thereby transmitting a measure of bias present. This proceeds, through resistor 122 acting as an input impedance, to the second amplifier and its associated capacitor, the resultant output being returned to the input of the main amplifier 94.

By virtue of the integrating process carried out in this second circuit, any A.C. component is smoothed out and the returned signal provides a D.C. bias similarly to the potentiometer 90, but the magnitude of this second bias is now determined by the residual bias of the photomultiplier input to the main amplifier at any stage. To aid the initial manual adjustment of the carriage movement the second amplifying circuit is initially kept out of operation by closure of switch 124 in parallel with the amplifier 116.

Movement of the cross-carriage 12 is synchronised with movement of the carriage 2 by driving the cross-carriage from a second eccentric 126 on the power shaft 48 and a connecting rod 126a. The cutting tool is mounted on a hinged plate 128 and, during the return stroke, a microswitch 130 is closed by the eccentric 126 to start a motor 132 driving an air pump 134 which actuates a vacuum cylinder 136 connected between saddle 138 of the cross-carriage and the plate 128 to raise the tool clear of the workpiece.

Variation of air density during the ruling of the blank can affect the accuracy of the finished product when the path lengths between the reflectors 32, 34 and the beam splitter 30 are unequal. A barometric control may therefore be included, this comprising a rotatable optical plate 139 in one of these two paths, the filtering effect of which increases with its obliquity. One form of control by the deflection of such a plate has already been described by H. Babcock in "Applied Optics," July 1962, volume 1, No. 4.

In the present example, changes of atmospheric pressure are sensed and followed by the device illustrated in FIG. 3. This comprises a barometric mercury column 160 standing in a mercury pool in a vessel 161 on a platform 162 which is raised and lowered by motor 163 acting through reduction gearing 164. The electrical supply to the motor is directed through a reversing switch 165 the position of which is controlled by a solenoid 166. A low voltage supply 167 for the solenoid is connected to it through the mercury column, a contact 168 being sealed in the glass of the tube. The sensing means may alternatively comprise a light beam and photo-detector on opposite sides of the column.

As illustrated in the figure, the solenoid is de-energised, thereby causing the motor to rotate to raise the vessel 161 until the mercury in the tube meets the contact 168 when energisation of the solenoid reverses the direction of rotation of the motor. The device therefore hunts continually about a mean position. A slave motor 169 (FIG. 1) is connected in parallel with the motor 163 by conductors 170 and the movements of the device are thus followed by the second motor and fed to a mechanical integrator 171.

The integrator allows a correction to be introduced for the effect of changing path length between the elements 30, 34, its second input being taken from a wedge-form cam 172. This can move with the carriage but, to avoid imposing any mechanical restraint on the carriage it is not directly connected thereto but is instead driven by a motor 173, the energisation of which is controlled by a microswitch arrangement 174 between the cam and the carriage.

Shaft 175 transmits the integrator output to a linkage 176 controlling the rotation of the plate 139 about a central pivot 139a.

The desirability of preventing any sticking of the carriage movement during operation of the apparatus has already been mentioned. In this connection, one preferred feature of the illustrated embodiment of the invention is the novel seal provided between the ram piston 16 and cylinder 18. This is shown in FIG. 4 where it will be seen that the end of the cylinder body 18a carries an end ring 140 secured to it by screws 142, a recess formed on the inner wall of the cylinder between the body and the ring clamping a bearing ring 144 of polytetrafluoroethylene. This has in its inner surface a V-groove 146 some few thousandths of an inch wide which is in communication with a vertical tube 148 containing mercury. The cylinder and piston walls have a clearance between them of less than one thousandth of an inch and are kept out of contact with each other by the mercury in the V-groove which, by virtue of its surface tension, is retained in the groove to provide a stick-free seating. The mercury also closes the clearance between the piston and cylinder and it is found to form a completely leak-proof seal.

Reference has been made above to a single ruling tool on the cross-carriage 12. FIGS. 5, 6 and 7 show a form of cross-carriage having two ruling tools. The construction comprises a base 178, upon which are mounted, through leaf spring hinges 179, two plates 180, 181, each plate carrying respective tools 182, 183. A bridge piece 184, secured by screws 185 to the base has mounted upon it a vacuum cylinder 186, which corresponds to the cylinder 136 shown in FIG. 1.

The cross-carriage is supported on the guides 10 by polytetrafluoroethylene pads 204 which are secured to projections 206 of the base 178. Further polytetrafluoroethylene pads 208 are provided on each side of the cross-carriage and contact the respective inside surfaces of the guides.

As described before, upon actuation of the cylinder 186, a piston 187, which projects through the cylinder and passes through an aperture formed by a recess in each plate 180, 181, raises the plates and this brings the tools clear of the blank as the blank is advanced to the next ruling station.

As the ruling is taking place, the tools are held down on the blank by the weight of the plates and by the action of respective leaf springs 202, 203.

Two adjustable stops 188 are provided to limit the upward movement of the plates. The ruling tools are each mounted on the plates 180, 181 through individual holders 190, 191 and can be adjusted relatively to each other in the vertical direction by means of screws 192, 193. The horizontal distance between the tools can be adjusted by an arrangement comprising respective brackets 195 on the two plates. The brackets have fixed to them oppositely threaded screws 196 which engage in oppositely threaded ends of a barrel 198, one of the screws being urged away from the barrel by the action of a spring 200.

An important feature of the ruling tool suspension is the means provided for damping the downwards movement of each tool at the beginning of each ruling stroke.

The plates 180, 181 have extensions 180a, 181a which bear against portions of surface 210 of the base when the tools are lowered. A film of oil is introduced into the flat interface between each extension 180a, 181a and the surface 210: the upwards movement of the extensions with their plates after a ruling stroke is sufficiently small to maintain the oil in the clearances at the interfaces with the result that when the tools are lowered again, the oil will exert a viscous damping effect on the movement of the plates and so prevent any instability of movement, such as tool bounce, at the beginning of the ruling action.

In one example of the use of the double-tool cross-carriage, the tools are horizontally set at a distance corresponding to an integral number of grating lines and vertically adjusted to each other so that the leading tool forms a rough grating line and the following tool can finish the line to the required depth. Alternatively, the two tools can be set for the same depth of ruling, the horizontal spacing adjusted to an odd integral number of grating line spacings and the relative movement between the carriage and the cross-carriage after each operative stroke arranged to be double the grating line spacing required. Thus, two grating lines are ruled at each operative stroke, the following tool as the work proceeds, producing lines between successive lines that have already been ruled by the leading tool.

Care must of course be taken in the disposition of the apparatus described to maintain ambient conditions as constant as possible during the ruling of a grating. Thus, parts of the apparatus likely to produce vibrations and/or heat should be disposed at a distance from the carriage 2. This is not always indicated in the drawing which, for simplicity, has been restricted to a diagrammatic illustration of the apparatus.

It may be found, when large gratings are to be produced, that the weight of the workpiece and its supporting carriage is too great for accurate movement in the manner described above. In such cases, the workpiece can be stationary and relative longitudinal movement between it and the tool can be provided by movement of the cross-carriage by the ram.

What I claim and desire to secure by Letters Patent is:

1. A differential grating ruling mechanism comprising, in combination, a support for a grating blank, a cross-carriage, means for effecting transverse relative movement between the support and the cross-carriage, a ruling tool mounted on the cross-carriage to rule a grating line during said transverse relative movement, means for effecting longitudinal relative movement between the support and cross-carriage to produce a spaced series of said lines upon the blank, said longitudinal movement means comprising a hydraulic ram and a pressure fluid generating device operating said ram, the mechanism including measurement means responsive to the change of relative longitudinal position, at succeeding ruling stations, between the support and the cross-carriage, and servo means actuable by said measurement means and being connected to said pressure generating device to control the flow therethrough to said hydraulic ram in dependence upon the change of said relative position.

2. A mechanism according to claim 1 wherein said ram comprises relatively horizontally movable cylinder and piston members and peripheral sealing means therebetween, said sealing means including an annular groove in one of said members and feed means leading to said groove, a mercury sealing medium being supplied through said feed means to said groove, the groove cross-sectional dimensions and the radial clearance between said members being so inter-related as to permit the meniscus of the mercury in the groove in said one member to extend outwardly of the groove to seal against the peripheral surface of the other of said members and to support one of said members.

3. A mechanism according to claim 1 wherein said cross-carriage has a ruling tool mounting comprising a support element fixed relative to the cross-carriage and a suspension element supported on the cross-carriage and movable relative to said support element, the ruling tool being fixed to the suspension element whereby the tool is movable between a raised inoperative position and a lowered operative position during said transverse relative movement, respective portions of said support and suspension elements being arranged to overlie each other to form an interface, the clearance at said interface being determined by the movement of the suspension element, a viscous fluid layer at said interface being maintained in continuous contact with the opposed surfaces of both said element portions to provide a damping force during movement of the tool from its inoperative to its operative position.

4. Grating ruling apparatus comprising, in combination a workpiece platform and a tool carrier, guides supporting said carrier whereby the carrier is reciprocable transversely across the platform to form a grating line in the surface of a workpiece thereon, longitudinal relative movement means between the platform and the carrier to permit the forming of a spaced series of grating lines on the workpiece, said means including a fluid pressure generating device, a hydraulic ram, fluid connection means between said device and ram, a main actuating device connected to said generating device for cyclic operation thereof whereby said ram is arranged to perform a series of step-wise movements, measurement means responsive to the change of relative longitudinal position at each movement step, servo means connected to said main actuating device to operate in the intervals between successive movements, signal transfer means to the servo means from the measurement means, and cyclically operable energisation means for the servo means operable by the main actuating device whereby the servo means are connected to said generating device during said intervals to control the flow therethrough in dependence upon the signal from the measurement means.

5. Apparatus according to claim 4 wherein the main actuating device comprises a rotary shaft, and cam-operated switch means engageable by said shaft for the energisation of the servo mechanism.

6. Apparatus according to claim 4 wherein said servo means includes an amplifying detector circuit for said signal, a servomotor and interconnection means between said circuit and servomotor, a drive connection from the servomotor to said generating device, said drive connection being cyclically operable by the main actuating device to interconnect the servomotor and generating device during said intervals, and a reset device connectable to the servomotor being arranged to return the servomotor to a neutral position after each disengagement of the servomotor and generating device.

7. Apparatus according to claim 6 wherein said reset device comprises a feed-back potentiometer, a follower mechanism connecting the potentiometer and servomotor whereby operative movement of the servomotor by said circuit energises the potentiometer and deenergisation of the potentiometer after disengagement of said drive connection causes the servomotor to make a return movement.

8. Apparatus according to claim 6 wherein a compensating cylinder is provided in a fluid line to the ram, the servomotor being arranged to alter the internal volume of the cylinder in dependence upon the detection circuit output to provide a correcting movement of the ram.

9. Grating ruling apparatus comprising, in combination, a first carrier for a grating blank and a second carrier for a ruling tool, mounting means for said two carriers whereby the tool is movable transversely across the blank and the tool and blank are longitudinally movable relative to each other, and synchronised operating means for effecting said transverse and longitudinal movements, the operating means for said longitudinal movements including a hydraulic ram, a positive displacement pump connected to said ram, actuating mechanism for said pump, servo means connectable to said mechanism to control the displacement volume of the pump, and measurement means responsive to said longitudinal movement to generate an input signal for said servo means whereby the flow through the pump is controlled in dependence upon changes of relative longitudinal position between said two carriers.

10. Apparatus according to claim 9 wherein the pump is provided with a controlling mechanism arranged to cause a small but rapid reversal of its stroke at the end of a ram-operating movement.

11. Apparatus according to claim 10 wherein the pump is actuated by a linkage comprising a pair of co-extending levers pivoted together at one end adjacent a first support, a pump-operating link pivoted to a first of the levers at a position spaced from said support, a second support for said first lever oppositely spaced from said link, cyclic deflection means for the second of said levers, and resilient interconnection means between the levers so that they are movable together when in abutment with said first support, said second support being arranged to abut the first lever at the end of a ram-operating movement to change the fulcrum of the first lever and thereby reverse the direction of movement of the pump-operating link.

12. Apparatus according to claim 11 wherein the connection of the servomotor to the pump comprises a control mechanism carrying said second support so that the support is movable relative to the levers under the actuation of the servomotor to adjustably terminate the ram-operating movement of the levers.

13. A differential grating ruling mechanism comprising first and second support means for a grating blank and a ruling tool respectively, guide means locating said support means relative to each other and permitting relative transverse and longitudinal movements between the blank and tool, drive means for effecting said movements, measurement means for evaluation of said longitudinal movement, said measurement means comprising an optional interferometer having respective reflector surfaces longitudinally fixed relative to the first and second support means, movement means for effecting said longitudinal movement including a hydraulic ram and a pressure fluid generator operatively connected to said ram, and longitudinal movement control means having an input connection from the measurement means and an output connection to said generator, said control means being actuable by said input to produce a governing movement through said output connection in dependence upon the fractional value of the interference fringes passed by said interferometer during a relative longitudinal movement between said two support means whereby said generator output is determined by the deviation of each said relative movement from a predetermined value.

14. Apparatus according to claim 13 wherein said movement control means comprises an amplifying detector unit and a servomotor receiving an error signal therefrom and having said output connection to said generator.

15. Apparatus according to claim 14 wherein D.C. bias voltage means are connected to said input connection to compensate for residual illumination from the interferometer.

16. Apparatus according to claim 14 having a supplementary amplifier circuit connected to said detector circuit and comprising means sensitive to a D.C. bias in said signal during the passage of said fringes said supplementary circuit being arranged to generate a D.C. signal cancelling said bias.

17. Apparatus according to claim 13 wherein means are provided to compensate for variation of air density during the ruling of a blank, said means comprising an adjustable filter in one branch of the interferometer, means for adjustment of said filter, an integrating mechanism controlling said adjustment means, a barometric device including pressure-sensitive means, a follower mechanism actuable by said pressure-sensitive means being arranged to generate a signal forming a first input to the integrating mechanism, and a length-sensitive device, actuable in dependence upon the changing distance of the movable reflector of the interferometer during the ruling of the blank, being arranged to generate a second input signal for the integrating mechanism.

18. Grating ruling apparatus comprising, in combination, a grating blank support and a ruling tool support, mounting means for said supports, said means permitting relative transverse movement between the supports to determine the length of the grating lines and relative longitudinal movement between the supports to determine the spacing of said lines, actuating means for said longitudinal movements comprising a hydraulic ram, guide means for a movable part of said ram, said guide means including a pair of guide surfaces on opposed sides of the ram and at a level adjacent the centre line of the ram, said movable part having bearing elements mounted adjacent said centre line and resting upon said surfaces, a fluid pressure generating device supplying fluid to said ram, measurement means including respective elements fixed relative to said two supports to derive an indication of said longitudinal movements, and servo means having an input channel from said measurement means and an output control element connected to said generating device whereby the fluid flow through the generating device is determined by said measurement means input and said relative longitudinal movement is controlled in relation thereto.

19. Apparatus according to claim 18 wherein the ram has a fixed piston and a cylinder movable on said piston projecting forwardly from the piston towards said supports and slidable on said guide means, said bearing elements being carried on the forward end of the cylinder.

20. Apparatus according to claim 18 wherein the grating blank support comprises a platform arranged to be longitudinally movable during the ruling of a blank, a stationary base structure carrying said platform, said base structure having upwardly directed peripheral walls including opposed side walls forming guides for the platform, said structure providing a liquid reservoir whereby a hydrostatic support force is supplied to the platform to relieve the reaction on said guides.

21. A mechanism according to claim 18 having a strut connecting said platform to the ram, point bearings being provided at both ends of the ram, said bearings lying on a central axis of the ram.

22. A differential grating ruling mechanism comprising a carriage for a workpiece, a tool-bearing cross-carriage movable transversely across the carriage, a hydraulic ram directed longitudinally to said carriage having a movable part connected to the carriage whereby the carriage is longitudinally movable relative to the cross-carriage to produce a succession of grating lines at spaced intervals on the workpiece, a positive displacement pump being provided to apply pressure fluid to said ram for said movement between successive stations, a gravity load attached to the movable part of the ram to act in opposition to said fluid pressure, measurement means for said longitudinal movement comprising respective elements fixed relative to the carriage and cross-carriage, detection means for said measurement means being arranged to derive an error signal in dependence upon the deviation of each movement between successive stations from a predetermined value, and a servo mechanism actuable by said error signal being arranged to adjust both the relative longitudinal position between the carriage and cross-carriage before the ruling of a succeeding grating line and the delivery volume of the pump in the succeeding longitudinal movement in dependence upon the error signal value.

23. A mechnaism according to claim 22 having sealing means between the piston and cylinder of the ram comprising a bearing ring of low friction material on the inner wall of the cylinder, an annular groove in the inner periphery of said ring being arranged to be filled with the mercury so that the meniscus of the mercury extends radially inwards of said inner periphery to seal against the piston periphery.

24. A mechanism according to claim 22 wherein the cross-carriage has a plurality of ruling tools for the simultaneous ruling of a plurality of grating lines, and location adjustment means being provided on the carriage for said tools whereby the tools are adjustable in vertical and lateral relationship to each other to alter the spacing and depth of the said lines.

25. Grating ruling apparatus comprising, in combination, a workpiece platform, a tool carrier, guides supporting said carrier whereby the carrier is reciprocable transversely across the platform, a tool mount movable on said carrier between a lowered, tool-operating position and a raised, tool-idling position, respective actuating means for said carrier and mount movements, synchronisation means controlling said actuating means to cause the mount to assume the lowered position during a forward stroke of the carrier and to assume the raised position during a return stroke of the carrier, respective complementary surfaces on said carrier and mount, said surfaces overlapping each other and a clearance between said surfaces being varied in accordance with the movement of the mount, a viscous fluid layer filling said clearance whereby a damping force is exerted by said film when said mount surface approaches said carrier surface, longitudinal relative movement means between the platform and the carrier to permit the formation of spaced grating lines on the workpiece through repeated reciprocation of the carrier, a step-wise actuating device for said longitudinal movement, said synchronisation means being operatively connected to said device to cause each movement step to be carried out during a return stroke of the carriage, measurement means responsive to the change of relative longitudinal position at each movement step, servo means connected to the step-wise actuating device, and signal transmission means interconnecting said measurement and servo means to actuate said servo means, said synchronisation means being arranged to cause corrective movements to be applied from said servo means to said actuating device in cyclic dependence to the movement of the tool carrier.

References Cited

UNITED STATES PATENTS

| 2,389,731 | 11/1945 | Johnson | 77—32.1 X |
| 2,527,338 | 10/1950 | Stamm | 33—32 |
| 2,769,191 | 9/1956 | Wells | 77—64 |
| 2,927,829 | 3/1960 | Porter | 277—135 |

FOREIGN PATENTS

| 1,007,735 | 10/1965 | Great Britain. |

OTHER REFERENCES

"Some New Advances in Grating Ruling, etc.," Applied Optics, vol. 3, No. 11, November 1964, pages 1251–1260.

LEONARD FORMAN, *Primary Examiner.*

H. N. HAROIAN, *Examiner.*